United States Patent [19]

Speer

[11] Patent Number: 5,226,768

[45] Date of Patent: Jul. 13, 1993

[54] ANCHOR BOLT CONSTRUCTION

[76] Inventor: Lane L. Speer, 4829 Eider Dr., Corpus Christi, Tex. 78413

[21] Appl. No.: 724,074

[22] Filed: Jul. 1, 1991

[51] Int. Cl.$^5$ .............................................. F16B 21/00
[52] U.S. Cl. ..................................... 411/344; 411/21
[58] Field of Search ................ 411/21, 340, 341, 342, 411/344, 345

[56] References Cited

U.S. PATENT DOCUMENTS

| | | | |
|---|---|---|---|
| 499,444 | 6/1893 | Schumann | 411/344 |
| 620,934 | 3/1899 | Kilgore | 411/344 |
| 868,353 | 10/1907 | Martin, Jr. | 411/344 |
| 1,024,949 | 4/1912 | Munger . | |
| 2,404,169 | 7/1946 | Gidden | 411/340 |
| 3,385,156 | 5/1968 | Polos . | |
| 3,487,746 | 1/1970 | Kapnek . | |

*Primary Examiner*—Neill R. Wilson

[57] ABSTRACT

An expansible anchor bolt construction (10) including: a hollow cylindrical housing (20) equipped with a pair of pivoted anchor wings (12), which are forced into an expanded disposition relative to the housing (20) by the passage of a threaded bolt (13); and, a locking collar (14) disposed within the housing (20) and adapted to be engaged by the threaded bolt (13) to draw the locking collar (14) into captive engagement with the anchor wings (12).

4 Claims, 2 Drawing Sheets

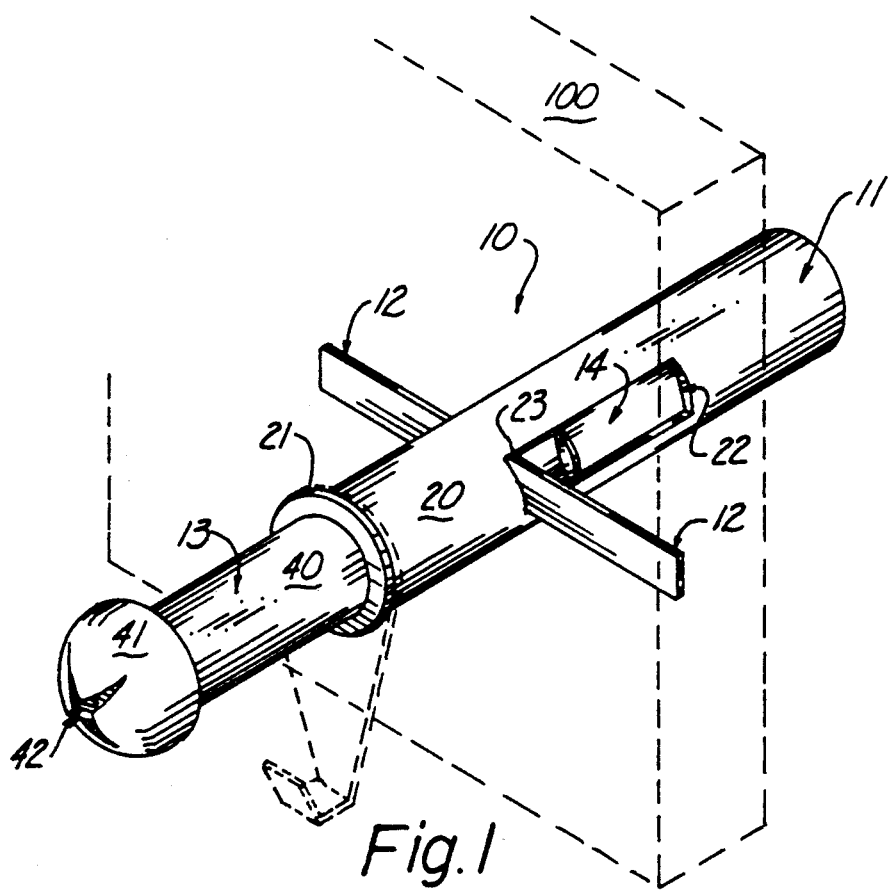
Fig. 1
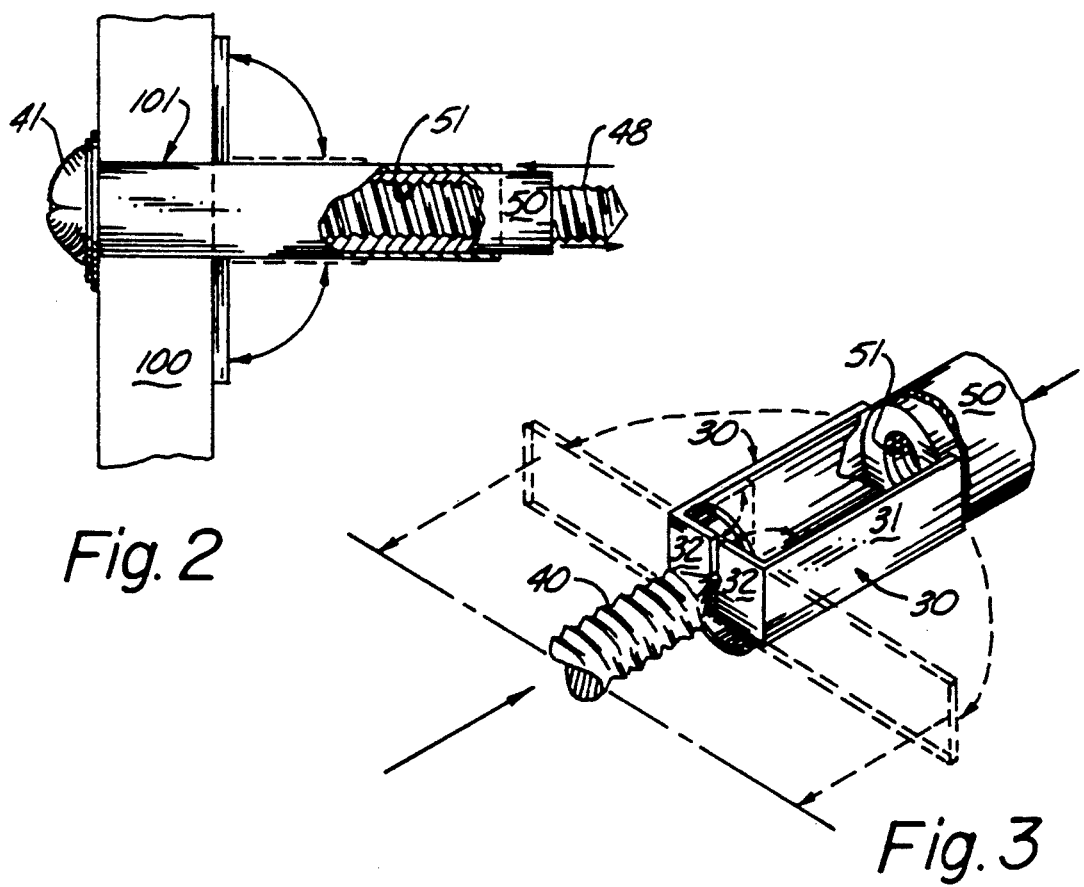
Fig. 2
Fig. 3

ANCHOR BOLT CONSTRUCTION

TECHNICAL FIELD

The present invention relates to the field of anchor bolts in general, and in particular to the area of expansible anchor bolts which expand laterally to enlarge the effective diameter of the bolt relative to the entry hole that the bolt has penetrated.

BACKGROUND ART

As can be seen by reference to the following U.S. Pat. Nos. 1,024,949; 3,385,156; 3,487,746; and 4,828,439; the prior art is replete with myriad and diverse expansible anchor bolt constructions.

While all of the aforementioned prior art constructions are more than adequate for the basic purpose and function for which they have been specifically designed, these patented devices are uniformly deficient with respect to the fact that the threaded bolt cooperates only with a primary outer housing member to expand the primary housing member to anchor the bolt on the opposite side of a panel; and, their are no provisions made for a positive locking mechanism that is moveable relative to the primary housing member and the threaded bolt to selectively lock and release the wings of the outer housing member into and out of flush engagement with the interior wall of the building panel.

As a consequence of the foregoing situation, there has existed a longstanding need for a positive locking and release type expansible anchor bolt construction, having a reciprocable locking mechanism that will allow the anchor wings to engage the wall panels in a flush manner; and, the provision of such a construction is a stated objective of the present invention.

DISCLOSURE OF THE INVENTION

Briefly stated, the expansible anchor bolt construction that forms the basis of the present invention comprises in general: an outer housing member equipped with a pair of pivotable anchor wings; a threaded anchor bolt dimensioned to be received within the housing member and to engage the anchor wings to pivot them outwardly relative to the housing member; and, a threaded internal locking collar disposed on the inboard end of the housing member; wherein, the locking collar is adapted to be threadably engaged by the anchor bolt to draw the collar into releasable locking engagement with the anchor wings.

As will be explained in greater detail further on in the specification, this positive locking feature offers a significant advancement over the prior art constructions in that it allows the main components of the anchor bolt assembly to be quickly and easily withdrawn from engagement with the wall panel if so desired.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the expansible anchor bolt of this invention operatively engaged on both sides of a wall panel;

FIG. 2 is a cross-sectional view of the wall panel showing the operative engagement of the anchor bolt of this invention;

FIG. 3 is an enlarged detail view of the operative engagement of the threaded bolt with the anchor wings; and, FIG. 4 is a perspective view illustrating the locking engagement of the locking collar relative to the anchor wings.

BEST MODE FOR CARRYING OUT THE INVENTION

Figure 4:
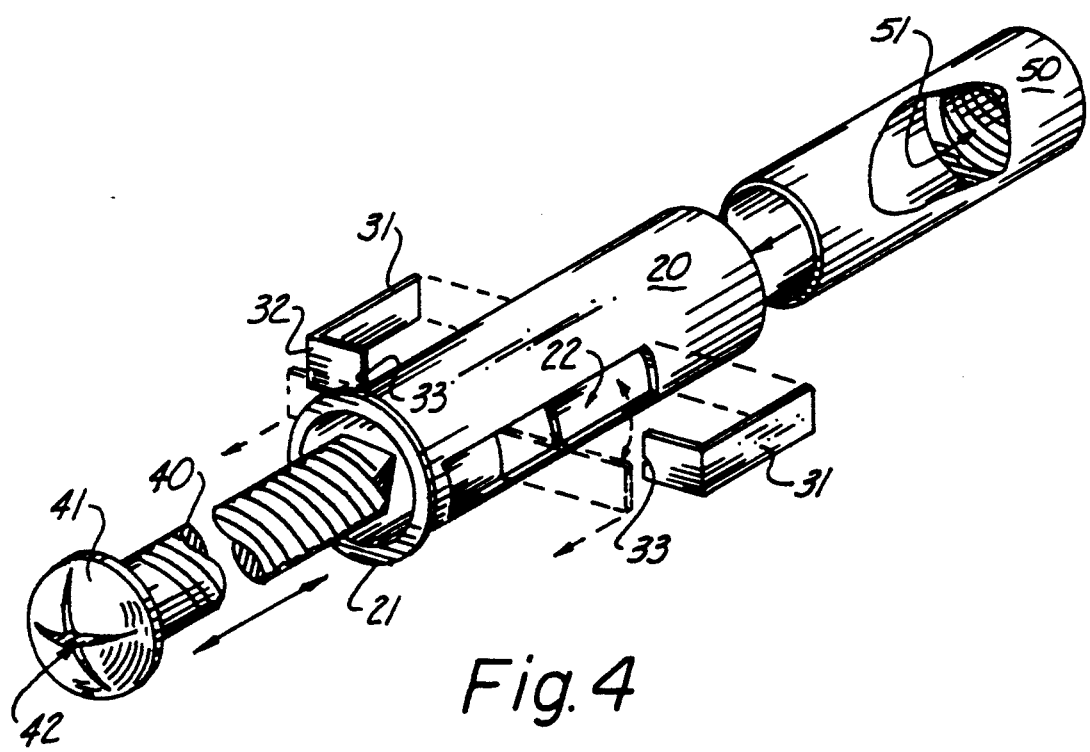

As can be seen by reference to the drawings, and in particular to FIG. 1 the expansible anchor bolt construction that forms the basis of the present invention is designated generally by the reference numeral (10). The construction (10) comprises in general: a main housing member (11) having a plurality of anchor wings (12); a threaded bolt (13); and a locking collar (14). These components will now be described in seriatim fashion.

As shown in FIGS. 1 through 3, the main housing member (11) comprises an elongated enlarged diameter hollow cylindrical housing (20) whose outside diameter closely approximates the diameter of a bore (101) formed in a wall panel (100). In addition the cylindrical housing (20) is further provided with an enlarged flanged head (21) formed on its outboard end; and, a plurality of elongated peripheral apertures (22) disposed along its opposite sides; wherein, the outboard end of the apertures (22) are further provided with discrete slots (23) whose purpose and function will be explained in greater detail further on in the specification.

As can best be seen by reference to FIGS. 2 through 4, the anchor wings (12) comprise a pair of inwardly facing generally L-shaped wing members (30); each having an elongated leg element (31) adapted to be received in the aperture (22) of the cylindrical housing member (20); and, a relatively short foot element (32) which projects towards the center of the housing (20); wherein, the inboard ends of each foot element is provided with a discrete notch (33) whose purpose and function will be described presently.

Still referring to FIGS. 2 through 4, it can be seen that the threaded bolt (13) comprises a generally elongated threaded bolt shaft (40) having an enlarged head element (41) provided with a notched recess (42) that will accept a conventional driver, such as a screwdriver or the like (not shown).

As can also be seen by reference to FIGS. 2 through 4, the locking collar (14) comprises a reduced diameter hollow cylindrical collar member (50) having a smooth exterior surface which is frictionally yet slideably received in the internal bore of the hollow cylindrical housing (20). In addition the hollow collar member (50) is further provided with internal threads (51) which are dimensioned to receive the threaded bolt shaft (40) in a well recognized manner.

As can best be seen by reference to FIGS. 3 and 4, the feet (32) of the anchor wings (30) are dimensioned to be received in the discrete slots (23) of the cylindrical housing (20) to orient the anchor wings (30) as depicted in FIG. 3. Then as the point of the threaded bolt shaft (40) engages the notches (32) in the feet elements (31) of the anchor wings (30) the leg elements (31) are pivoted outwardly relative to the cylindrical housing (20).

At this point the threaded bolt (13) continues to travel through the interior of the cylindrical housing (20) until the threaded bolt shaft (40) engages the internal threads

(51) of the collar member (50). Clockwise rotation of the threaded bolt shaft (40) will then cause the collar member (50) to move inwardly within the cylindrical housing (20) to bring the collar member (50) into locking engagement with the feet (31) of the anchor wings (30).

When the user wishes to remove the anchor bolt construction (10) from the wall (100) all that is necessary is to reverse the engagement of the threaded bolt shaft (40) relative to the collar member (50). Then once the bolt shaft (40) is disengaged from the collar member (50); the withdrawal of the bolt shaft (40) from the cylindrical housing (20) will allow the anchor wings (30) to be pivoted back to the position depicted in solid lines in FIG. 3, to allow the anchor construction (10) to be withdrawn through the bore (101) in the wall (100).

having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. An expansible anchor bolt construction comprising:
   a main elongated hollow cylindrical housing having an enlarged fanged head element formed on one end and two elongated apertures formed on opposite sides of said a main cylindrical housing; wherein, one end of each of said elongated apertures is further provided with a discrete slot which extends circumferentially from the respective apertures;
   a pair of inwardly facing generally L-shaped wing members operatively associated with said main cylindrical housing; and,
   means for pivotally moving said wing members from a retracted position relative to said main cylindrical housing to an expanded position relative to said main cylindrical housing;
   wherein, said means for pivotally moving said wing members comprises a threaded bolt having an elongated threaded bolt shaft formed on one end and an enlarged head element formed on the other end.

2. The construction as in claim 1; wherein each of the generally L-shaped wing members is provided with a relatively elongated leg element and a relatively short foot elements; wherein, the foot elements are dimensioned to be received in the discrete slots on opposite sides of the main cylindrical housing, and extend towards the center of the interior of the hollow cylindrical housing.

3. The construction as in claim 1; further including,
   locking means operatively associated with said means for pivotally moving said wing members; wherein, said locking means are adapted to captively engage said wing members in the expanded disposition.

4. The construction as in claim 2; further including a hollow reduced diameter hollow cylindrical locking collar member frictionally yet slideably disposed in the interior of said hollow cylindrical housing; wherein the interior of the locking collar member is provided with threads adapted to be engaged by the threaded bolt for axially translating said locking collar in a reciprocating fashion relative to the interior of said cylindrical housing.

* * * * *